United States Patent
Shi et al.

(10) Patent No.: US 11,230,483 B2
(45) Date of Patent: Jan. 25, 2022

(54) METHOD FOR SYSTEMATICALLY CONTROLLING RAPID PROLIFERATION OF CYANOBACTERIA CELLS IN LAKES IN SPRING

(71) Applicant: NANJING INSTITUTE OF GEOGRAPHY & LIMNOLOGY. CHINESE ACADEMY OF SCIENCES, Nanjing (CN)

(72) Inventors: Xiaoli Shi, Nanjing (CN); Kaining Chen, Nanjing (CN); Min Zhang, Nanjing (CN); Zhen Yang, Nanjing (CN); Yang Yu, Nanjing (CN)

(73) Assignee: NANJING INSTITUTE OF GEOGRAPHY & LIMNOLOGY. CHINESE ACADEMY OF SCIENCES, Jiangsu (CN)

( * ) Notice: Subject to any disclaimer, the term of this patent is extended or adjusted under 35 U.S.C. 154(b) by 0 days.

(21) Appl. No.: 17/047,410

(22) PCT Filed: Apr. 16, 2019

(86) PCT No.: PCT/CN2019/082836
§ 371 (c)(1),
(2) Date: Oct. 14, 2020

(87) PCT Pub. No.: WO2019/201230
PCT Pub. Date: Oct. 24, 2019

(65) Prior Publication Data
US 2021/0114906 A1 Apr. 22, 2021

(30) Foreign Application Priority Data
Apr. 16, 2018 (CN) .......................... 201810339017.8

(51) Int. Cl.
C02F 3/32 (2006.01)
C02F 1/28 (2006.01)
(Continued)

(52) U.S. Cl.
CPC .............. *C02F 3/327* (2013.01); *C02F 1/286* (2013.01); *C02F 1/50* (2013.01); *C02F 9/00* (2013.01)

(58) Field of Classification Search
CPC ............................ E02B 1/00; E02B 15/0814
(Continued)

(56) References Cited

U.S. PATENT DOCUMENTS 6,893,567 B1 * 5/2005 Vanotti ................. C02F 1/5245
210/605
2003/0230529 A1 * 12/2003 Austin .................... C02F 3/327
210/602

(Continued)

FOREIGN PATENT DOCUMENTS

CN 101591040 A * 12/2009
CN 101811811 A 8/2010
(Continued)

OTHER PUBLICATIONS

"Influence of zeta potentail on the flocculation of cyanobacterial cells using chitosan modified soil", Liang Li et al., Journal of environmental sciences, vol. 28, Feb. 1, 2015, pp. 47-53. (Year: 2015).*

*Primary Examiner* — Nina Bhat
(74) *Attorney, Agent, or Firm* — PROI Intellectual Property US; Klaus Michael Schmid

(57) ABSTRACT

A method for systematically controlling rapid proliferation of cyanobacteria cells in lakes in spring is described. The method applies physical, biological and chemical methods in an integrated and synergistic manner and includes using (Continued)

flexible enclosures to close a control water area and using modified soil to adsorb and settle algal cells; coupling four technologies including algae control by fish, algae control by biological floating islands, algae inhibition by plants and algae control by microorganisms; and using $H_2O_2$ to kW algae and using 40% $FeCl_3$+$CaCO_3$ and 50% $Ca(NO_3)_2$ to treat sediment. The method establishes a complete system for physical, chemical and biological control of algae, forms joint control of exogenous contaminants, endogenous contaminants and cyanobacteria, integrates physical, biological and chemical methods and optimizes systematic methods that are used synergistically.

13 Claims, 1 Drawing Sheet

(51) Int. Cl.
*C02F 1/50* (2006.01)
*C02F 9/00* (2006.01)

(58) Field of Classification Search
USPC ........................................................ 210/602
See application file for complete search history.

(56) References Cited

U.S. PATENT DOCUMENTS

| | | | |
|---|---|---|---|
| 2012/0040034 A1* | 2/2012 | Rajalekshmi | A61K 36/00 424/771 |
| 2012/0145645 A1* | 6/2012 | Wietholter | C02F 1/5263 210/723 |
| 2013/0292329 A1* | 11/2013 | Northrop | B09C 1/10 210/602 |
| 2015/0353400 A1* | 12/2015 | Dube | C02F 1/286 210/665 |
| 2016/0366877 A1* | 12/2016 | Nicholas | C05D 9/02 |
| 2017/0225979 A1* | 8/2017 | Nicholas | C05D 9/02 |
| 2018/0127292 A1* | 5/2018 | Bettle, III | C02F 3/1284 |
| 2019/0208774 A1* | 7/2019 | Lei | A01N 59/00 |

FOREIGN PATENT DOCUMENTS

| | | | |
|---|---|---|---|
| CN | 101880100 A | | 11/2010 |
| CN | 102674556 A | | 9/2012 |
| CN | 105540808 A | | 5/2016 |
| CN | 108409047 A | | 8/2018 |
| CN | 108675454 A | | 10/2018 |
| KR | 20050086280 A | * | 8/2005 |
| WO | 9526932 A1 | | 10/1995 |

* cited by examiner

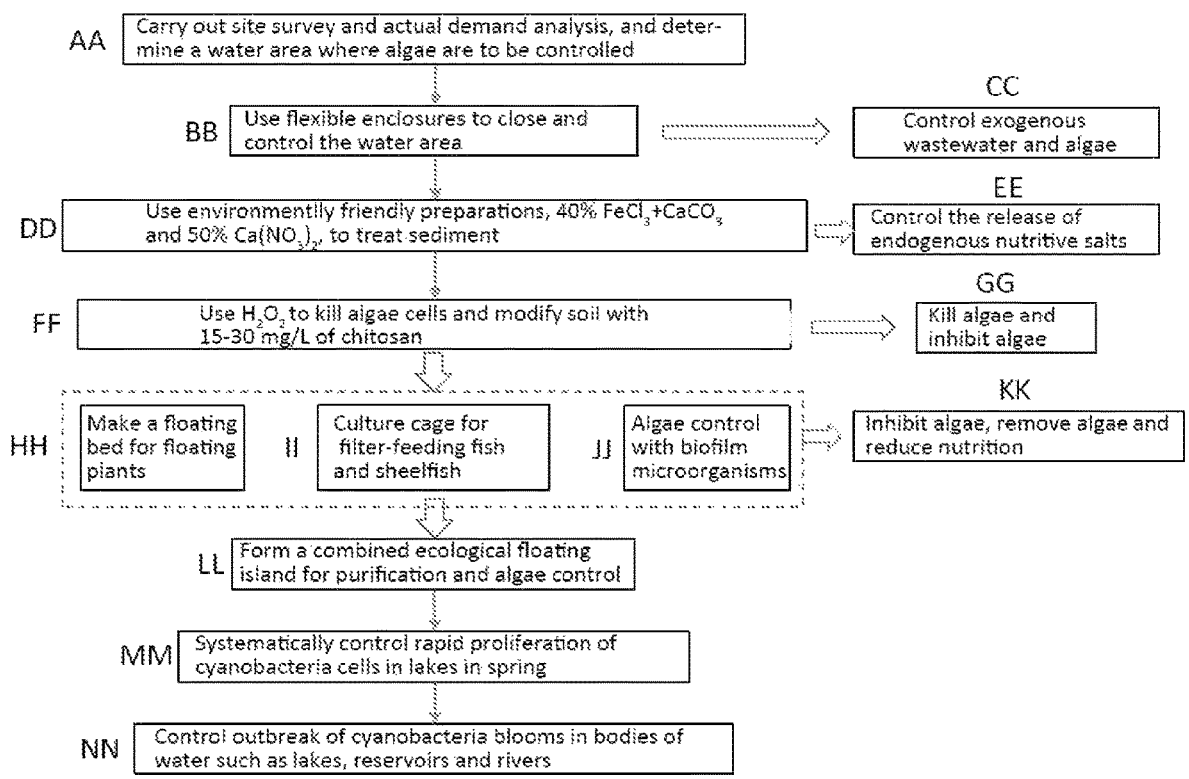

METHOD FOR SYSTEMATICALLY CONTROLLING RAPID PROLIFERATION OF CYANOBACTERIA CELLS IN LAKES IN SPRING

CROSS REFERENCE TO RELATED APPLICATIONS

The present application is the US national stage of International Patent Application PCT/CN2019/082836 filed on Apr. 16, 2019, which, in turn, claims priority to Chinese Patent Application CN 201810339017.8 filed on Apr. 16, 2018.

TECHNICAL FIELD

The present invention pertains to the technical domains of water environment treatment and cyanobacterial bloom control in the fields of environmental science and ecology and specifically relates to a method for systematically controlling rapid proliferation of cyanobacteria cells in lakes in spring.

BACKGROUND ART

The environmental problems of lakes in our country are serious, especially the problem of eutrophication. According to the survey, more than 40% of the lakes in our country have the problem of eutrophication, cyanobacterial blooms break out continually and the deterioration of water quality and ecological environment is not contained obviously, affecting the safety of water supply. In recent years, although the government has stepped up its control efforts and the nitrogen, phosphorus and COD of important lakes such as the Taihu Lake and the Chaohu have declined to a certain extent, the frequency and scale of cyanobacterial bloom outbreaks have not decreased and a large amount of cyanobacteria are accumulated in lakeside areas and important lake bays and rotten and stink, inducing secondary ecological disasters. At present, the cyanobacterial bloom control methods for lakes include algae removal by machine, algae removal by modified clay, algae control by fish, algae inhibition by plants, algae control by microorganisms, algae removal by preparations, etc. A popular method is emergency salvage measures, including manual salvage, cyanobacteria salvage boats, algae salvage platforms and algae and water separation stations for collection and disposal of cyanobacterial blooms. Although it plays a role in preventing secondary disasters, this treatment method is emergent and passive control and fails to effectively reverse the frequent occurrence of cyanobacterial blooms in lakes. The application effects of other methods mentioned above are also not ideal mainly because the current control of cyanobacteria mostly applies a single technology, ignores optimized combination and integrated application of technologies and has not formed a systematic solution. For lakes, reservoirs and other category-1 water ecosystems, there is no panacea for their treatment. A systematic approach and integrated technology must be adopted to achieve a significant effect. The studies in recent years have shown that cyanobacteria will "hibernate" and overwinter on the surface of bottom sediment in winter, and are resuscitated, grow and rise to the water surface for rapid proliferation in spring, causing mass outbreaks of cyanobacterial bloom in late spring and throughout the summer, and even till the end of autumn. The key process of cyanobacterial bloom outbreak is the resuscitation and rapid growth period in spring. If effective methods are taken to control the rapid proliferation of cyanobacteria in spring, their development momentum can be suppressed before the bloom outbreak in summer and the frequency and area of bloom can be significantly reduced. However, so far, almost no technologies for controlling the rapid growth of cyanobacteria in spring have been reported.

SUMMARY OF THE INVENTION

The objective of the present invention is to provide a method for systematically controlling rapid proliferation of cyanobacteria cells in lakes in spring. The method couples a plurality of algae control technologies such as physical isolation, treatment by chemical preparations, algae control by fish, algae control by biological floating islands, algae inhibition by plants and algae control by microorganisms and can reinforce the control over the rapid proliferation of cyanobacteria cells in spring and early summer and reduce the frequency and area of cyanobacterial bloom outbreak in summer.

In order to achieve the foregoing objective, the present invention adopts the following technical solution:

A method for systematically controlling rapid proliferation of cyanobacteria cells in lakes in spring, comprising:

determining an algae control water area and using flexible enclosures to close the control water area;

using $FeCl_3$, $CaCO_3$ and $Ca(NO_3)_2$ to treat sediment;

using $H_2O_2$ to kill the algae and then using modified soil to adsorb and settle the algal cells;

arranging an ecological floating island comprising floating plant beds, aquaculture net cages and biofilms in a closed water area; arranging the aquaculture net cages under the floating plant beds to breed filtering-feeding fish and shellfish; and hanging the biofilms at the lower ends of the aquaculture net cages for natural growth of periphyton; and deploying snails to the lakebed of the algae control water area.

Firstly, the location and range of the water area to be protected and controlled are determined based on the on-site investigation of the lake and the actual needs and meanwhile the water area where the wintering cyanobacteria are resuscitated and rapidly proliferated is determined to carry out targeted control; After determination of the protected and controlled area, flexible enclosures are used to close the control water area to cut off the impact of exogenous sewage or cyanobacteria in adjacent water areas on the control water area so as to effectively control the rapidly proliferated cyanobacteria.

After completion of the closure of the control water area, algae control measures are taken for the rapid growth period of cyanobacteria from March to June each year; environmentally friendly chemicals $FeCl_3+CaCO_3$ combined with $Ca(NO_3)_2$ are used to dispose of the sediment and control the release of endogenous nutritive salts; then $H_2O_2$ is used to kill the algae and then modified soil is used to adsorb and settle the algal cells; and lastly, algae control by fish, algae control by biological floating islands, algae inhibition by plants, algae control by microorganisms and other biological means are combined to control the algae.

Further, the structure of the flexible enclosures comprises floats, aprons and clump weights; the upper end of each apron is connected to a float and the lower end is connected to a clump weight to form the flexible enclosures to close the control water area to be protected; and the clump weights are stone cages or sand cages and are buried in bottom sediment.

Further, the $FeCl_3$, $CaCO_3$ and $Ca(NO_3)_2$ treat the sediment in the following way: 40% $FeCl_3$+$CaCO_3$ is injected into the surface sediment at first to make $Fe^{3+}$ reach about 300 g/m$^2$ and then 50% $Ca(NO_3)_2$ is injected into the surface sediment to make $NO_3$—N reach 10-12 g/m$^2$ to control phosphorus release of the bottom sediment and meanwhile provide electron donors to promote the denitrification process and achieve a nitrogen removal effect.

Further, 10-15 mg/L $H_2O_2$ is used to kill algal cells first and then 15-30 mg/L chitosan modified soil is deployed into the water body to adsorb and settle the algal cells;

Further, the floating plant beds are made from a combination community of *Alternanthera philoxeroides, Paspalum vaginatum* swartz and *Lolium perenne* in which *Alternanthera philoxeroides* is an edificator, and *Paspalum vaginatum* swartz and *Lolium perenne* are planted as supplements at a ratio of 6:2:2. The floating plant beds can be used to control algae by shading and inhibit algae by reducing nutritive salts in the water and using allelochemicals secreted by plant roots.

Further, aquaculture net cages are arranged under the floating plant beds and filtering-feeding fish and shellfish are bred inside the aquaculture net cages; the filtering-feeding fish is sliver carp and the breeding density is controlled at 100-150 g/m$^3$; the filtering-feeding shellfish is *Sinanodonta woodiana, Cristaria plicata*, or *Hyriopsis cumingii* and the breeding density is controlled at 300-400 g/m$^2$. Preferably, the dimensions of the aquaculture net cages are 0.6-1 m high, 5-8 m long and 3-4 m wide and the aquaculture net cages are connected to floating plant beds through polyethylene ropes. Small plant net cages facilitate field installation and transport. In addition, the aquaculture net cages are connected to floating plant beds through polyethylene ropes to facilitate separation from the floating plant beds to harvest fish.

Further, the lower ends of the aquaculture net cages use plastic nets or combined packing/elastic packing or tree branches/bamboo branches to construct and hang biofilms; when plastic nets are used to hang biofilms, the distance between the plastic nets is 15-20 cm; when combined packing or elastic packing is used to hang biofilms, the packing density is 25-35 pcs/m$^2$; when tree branches/bamboo branches are used to hang biofilms, they can be fully filled; and the biofilms are hung to the bottom. biofilms are hung at the lower ends of the aquaculture net cages for inhabitation and growth of beneficial microorganisms, which improve the algae removal effect. Periphyton (algae, protozoa, fungi, bacteria, etc.) gradually grows naturally on the surfaces of the biofilms, which secretes extracellular polymers, adsorbs suspended matter and finally forms a layer of membranoid substances dominated by organisms, organic matter and inorganic matter. By absorbing nutrients in the water and releasing allelochemicals, the biofilms provide breeding places for zooplankton, protozoa and benthic animals, offer food, shelters and spawning grounds for fish, keep out the sunlight and change the hydrological and hydrodynamic field of the water body so as to improve water quality, raise water transparency and inhibit the growth and reproduction of algae, thereby achieving the purpose of controlling algal blooms; all biofilms are hung to the bottom to facilitate the climbing and inhabitation of benthic animals and snails.

Further, after the above-mentioned combined ecological floating island is made, it is fixed with wooden stakes and polyethylene ropes; the ecological floating island shall cover 30%-50% of the water area.

Further, *cipangopaludina* is deployed into the control water area to eat the settled cyanobacteria debris and fish manure. The deployment density is 200-300 g/m$^2$.

The method of the present invention integrates and synergistically uses physical, biological and chemical methods, forming joint control of exogenous contaminants, endogenous contaminants and cyanobacteria. The synergy of a plurality of algae control means can efficiently, quickly and persistently control the rapid proliferation of cyanobacteria cells in lakes in spring and provide a technical support for the control of cyanobacterial blooms in lakes, reservoirs and other water bodies.

BRIEF DESCRIPTION OF THE DRAWINGS

FIG. 1 is a flow diagram of a method provided by the present invention.

DETAILED DESCRIPTION

Below the technical solution of the present invention is further described in detail by referring to embodiments.

Embodiment 1

From March to June 2017, the area within a semi-closed weir in the west half of the Chaohu Lake was selected to carry out a demonstration of algae control technology for the rapid growth period of cyanobacteria.

Flexible enclosures were used to close three control water areas, each with an area of 600 m$^2$, 1800 m$^2$ in total.

After completion of the closure of the control water areas, algae control measures were taken for the rapid growth period of cyanobacteria; environmentally friendly chemicals were used first, 40% $FeCl_3$+$CaCO_3$ was injected into the surface sediment to make $Fe^{3+}$ reach about 300 g/m$^2$ and then 50% $Ca(NO_3)_2$ was injected into the surface sediment to make $NO_3$—N reach 10 g/m$^2$ to control the release of phosphorus in the bottom sediment and promote the denitrification process on the sediment surface;

After completion of the above measures, 10 mg/L $H_2O_2$ was used to kill algae cells and then 20 mg/L chitosan modified soil was added to the water body to adsorb the settled algal cells;

3 m wide and 5 m long floating plant beds were arranged in the control water areas and made from a combination community of *Alternanthera philoxeroides, Paspalum vaginatum* swartz and *Lolium perenne* in which *Alternanthera philoxeroides* is an edificator, and *Paspalum vaginatum* swartz and *Lolium perenne* were planted as supplements at a ratio of 6:2:2;

After the floating plant beds were made, the combined aquaculture net cages were installed under the floating plant beds. 250-500 g/tail silver carp and *Sinanodonta woodiana* were bred to control algae. The 1 m high, 5 m long and 3 m wide aquaculture net cages were used to filter the algae in the water body, the breeding density of silver carp was controlled at 100-150 g/m$^3$ and the density of *Sinanodonta woodiana* was controlled at 300-400 g/m$^2$;

Biofilms were hung at the lower ends of aquaculture net cages and composite packing or elastic packing was used to naturally grow periphyton (algae, protozoa, fungi, bacteria, etc.), so that they naturally form films. The density of composite packing or elastic packing was 25-35 pcs/m$^2$;

The combined ecological floating island comprising floating plant beds, aquaculture net cages and biofilms for purification and algae control covered nearly 40% of the water areas.

Lastly, *cipangopaludina* was deployed to the control water areas to eat the settled cyanobacteria debris and fish manure. The deployment density was 250 g/m$^2$.

The monitoring results from April to June show that compared with the water body outside the control areas, the algae density and biomass in the control areas decreased by more than 60% and 80% respectively and no cyanobacterial bloom occurred in the control areas during the testing stage; the water transparency reached 1 m or more (the transparency outside the control areas was only about 30 cm), the concentrations of TN, TP and COD$_{Mn}$ in the water body decreased by 28%-35%, 32%-48% and 55%-60% respectively and the effect was significant.

Embodiment 2

From March to June 2015, the experimental enclosure ecosystem of the Taihu Station, Nanjing Institute of Geography and Limnology, Chinese Academy of Sciences was selected to carry out a demonstration of algae control technology for the rapid growth period of cyanobacteria. The control effect was observed until August.

Flexible enclosures were used to close three control water areas, each with an area of 100 m$^2$, 300 m$^2$ in total.

After completion of the closure of the control water areas, algae control measures were taken for the rapid growth period of cyanobacteria; environmentally friendly chemicals were used first, 40% FeCl$_3$+CaCO$_3$ was injected into the surface sediment to make Fe$^{3+}$ reach about 300 g/m$^2$ and then 50% Ca(NO$_3$)$_2$ was injected into the surface sediment to make NO$_3$—N reach 12 g/m$^2$ to control the release of phosphorus in the bottom sediment and promote the denitrification process on the sediment surface;

After completion of the above measures, 15 mg/L H$_2$O$_2$ was used to kill algae cells and then 15 mg/L chitosan modified soil was added to the water body to adsorb the settled algal cells;

4 m wide and 6 m long floating plant beds were arranged in the control water areas and made from a combination community of *Alternanthera philoxeroides, Paspalum vaginatum* swartz and *Lolium perenne* in which *Alternanthera philoxeroides* is an edificator, and *Paspalum vaginatum* swartz and *Lolium perenne* were planted as supplements at a ratio of 6:2:2;

After the floating plant beds were made, the combined aquaculture net cages were installed under the floating plant beds. 250-500 g/tail silver carp and *Sinanodonta woodiana* were bred to control algae. The 0.6 m high, 6 m long and 4 m wide aquaculture net cages were used to filter the algae in the water body, the breeding density of silver carp was controlled at 100-150 g/m$^3$ and the density of *Sinanodonta woodiana* was controlled at 300-400 g/m$^2$;

Biofilms were hung at the lower ends of the aquaculture net cages and plastic nets were used for natural growth of periphyton (algae, protozoa, fungi, bacteria, etc.) to naturally form membranoid substances. The distance between plastic nets for hanging biofilms was 15-20 cm;

The combined ecological floating island comprising floating plant beds, aquaculture net cages and biofilms for purification and algae control covered about 50% of the water areas.

Lastly, *cipangopaludina* was deployed to the control water areas to eat the settled cyanobacteria debris and fish manure. The deployment density was 200 g/m$^2$.

The monitoring results from April to August show that compared with the water body outside the control areas, the algae density and biomass in the control areas decreased by more than 76% and 65% respectively and no cyanobacterial bloom occurred in the control areas during the testing stage; the water transparency reached 1.2 m or more (the transparency outside the control areas was only about 25 cm), the concentrations of TN, TP and COD$_{Mn}$ in the water body decreased by 30%-37%, 40%-51% and 35%-43% respectively and the effect was significant.

Embodiment 3

From March to June 2016, the estuary water area of the Nanfei River into the Chaohu Lake was selected to carry out a demonstration of algae control technology for the rapid growth period of cyanobacteria.

Flexible enclosures were used to close a control water area, with an area of 10,000 m$^2$. The control effect was observed until September.

After completion of the closure of the control water area, algae control measures were taken for the rapid growth period of cyanobacteria; environmentally friendly chemicals were used first, 40% FeCl$_3$+CaCO$_3$ was injected into the surface sediment to make Fe$^{3+}$ reach about 300 g/m$^2$ and then 50% Ca(NO$_3$)$_2$ was injected into the surface sediment to make NO$_3$—N reach 11 g/m$^2$ to control the release of phosphorus in the bottom sediment and promote the denitrification process on the sediment surface; After completion of the above measures, 12 mg/L H$_2$O$_2$ was used to kill algae cells and then 30 mg/L chitosan modified soil was added to the water body to adsorb the settled algal cells;

96 3.5 m wide and 8 m long floating plant beds were arranged in the control water area and made from a combination community of *Alternanthera philoxeroides, Paspalum vaginatum* swartz and *Lolium perenne* in which *Alternanthera philoxeroides* is an edificator, and *Paspalum vaginatum* swartz and *Lolium perenne* were planted as supplements at a ratio of 6:2:2;

After the floating plant beds were made, the combined aquaculture net cages were installed under the floating plant beds. 250-500 g/tail silver carp and *Sinanodonta woodiana* were bred to control algae. The 0.8 m high, 8 m long and 3.5 m wide aquaculture net cages were used to filter the algae in the water body, the breeding density of silver carp was controlled at 100-150 g/m$^3$ and the density of *Sinanodonta woodiana* was controlled at 300-400 g/m$^2$;

Biofilms were hung at the lower ends of the aquaculture net cages and tree branches/bamboo branches were used for natural growth of periphyton (algae, protozoa, fungi, bacteria, etc.) to naturally form membranoid substances. The tree branches/bamboo branches were fully filled when biofilms were hung;

The combined ecological floating island comprising floating plant beds, aquaculture net cages and biofilms for purification and algae control covered nearly 30% of the water area.

Lastly, *cipangopaludina* was deployed to the control water area to eat the settled cyanobacteria debris and fish manure. The deployment density was 300 g/m$^2$.

The monitoring results from April to September show that compared with the water body outside the control area, the algae density and biomass in the control area decreased by more than 63% and 55% respectively and no cyanobacterial bloom occurred in the control area during the testing stage; the water transparency reached 0.8 m or more (the transparency outside the control area was only about 30 cm), the concentrations of TN, TP and COD$_{Mn}$ in the water body decreased by 26%-34%, 34%-43% and 42%-55% respectively and the effect was significant.

What is claimed is:

1. A method for systematically controlling rapid proliferation of cyanobacteria cells in lakes in spring, comprising:
   determining an algae control water area and using flexible enclosures to close the control water area;
   using $FeCl_3$, $CaCO_3$ and $Ca(NO_3)_2$ to treat sediment;
   using $H_2O_2$ to kill the algae and then using modified soil to adsorb and settle the algal cells;
   arranging an ecological floating island comprising floating plant beds, aquaculture net cages and biofilms in a closed water area; arranging the aquaculture net cages under the floating plant beds to breed filtering-feeding fish and shellfish; and hanging the biofilms at the lower ends of the aquaculture net cages for natural growth of periphyton; and
   deploying snails to the lakebed of the algae control water area.

2. The method according to claim 1, wherein the structure of the flexible enclosures comprises floats, aprons and clump weights; the upper end of each apron is connected to a float and the lower end is connected to a clump weight to form the flexible enclosures to close the control water area to be protected; and the clump weights are stone cages or sand cages and are buried in bottom sediment.

3. The method according to claim 1, wherein 40% $FeCl_3$+ $CaCO_3$ is injected into the surface sediment at first to make $Fe^{3+}$ reach about 300 g/m$^2$ and then 50% $Ca(NO_3)_2$ is injected into the surface sediment to make $NO_3$—N reach 10-12 g/m$^2$ to control phosphorus release of the bottom sediment.

4. The method according to claim 1, wherein 10-15 mg/L $H_2O_2$ is used to kill algal cells first and then 15-30 mg/L chitosan modified soil is deployed into the water body to adsorb and settle the algal cells.

5. The method according to claim 1, wherein the floating plant beds are made from a combination community of *Alternanthera philoxeroides, Paspalum vaginatum* swartz and *Lolium perenne* in which *Alternanthera philoxeroides* is an edificator, and *Paspalum vaginatum* swartz and *Lolium perenne* are planted as supplements at a ratio of 6:2:2.

6. The method according to claim 1, wherein the dimensions of the aquaculture net cages are 0.6-1 m high, 5-8 m long and 3-4 m wide and the aquaculture net cages are connected to floating plant beds through polyethylene ropes.

7. The method according to claim 1, wherein filtering-feeding fish and shellfish are bred inside the aquaculture net cages; the filtering-feeding fish is sliver carp and the breeding density is controlled at 100-150 g/m$^3$; and the filtering-feeding shellfish is *Sinanodonta woodiana, Cristaria plicata*, or *Hyriopsis cumingii* and the breeding density is controlled at 300-400 g/m$^2$.

8. The method according to claim 5, wherein filtering-feeding fish and shellfish are bred inside the aquaculture net cages; the filtering-feeding fish is sliver carp and the breeding density is controlled at 100-150 g/m$^3$; and the filtering-feeding shellfish is *Sinanodonta woodiana, Cristaria plicata*, or *Hyriopsis cumingii* and the breeding density is controlled at 300-400 g/m$^2$.

9. The method according to claim 1, wherein the lower ends of the aquaculture net cages use plastic nets or combined packing/elastic packing or tree branches/bamboo branches to construct and hang biofilms; when plastic nets are used to hang biofilms, the distance between the plastic nets is 15-20 cm; when combined packing or elastic packing is used to hang biofilms, the packing density is 25-35 pcs/m$^2$; when tree branches/bamboo branches are used to hang biofilms, they can be fully filled; and the biofilms are hung to the water bottom.

10. The method according to claim 1, wherein the ecological floating island covers 30%-50% of the water area.

11. The method according to claim 1, wherein the deployment density of snails to the lake bottom is 200-300 g/m$^2$.

12. The method according to claim 1, wherein the snails are *cipangopaludina*.

13. The method according to claim 12, wherein the snails are *cipangopaludina*.

* * * * *